United States Patent
Kuboki et al.

(10) Patent No.: US 9,475,735 B2
(45) Date of Patent: Oct. 25, 2016

(54) HIGH ZIRCONIA FUSED CAST REFRACTORY

(71) Applicant: SAINT-GOBAIN TM K.K., Tokyo (JP)

(72) Inventors: Toshimitsu Kuboki, Tokyo (JP); Hiroshi Sugiyama, Tokyo (JP); Yasuo Misu, Tokyo (JP); Itaru Hashimoto, Tokyo (JP)

(73) Assignee: SAINT-GOBAIN TM K.K., Tokyo (JP)

( * ) Notice: Subject to any disclaimer, the term of this patent is extended or adjusted under 35 U.S.C. 154(b) by 0 days.

(21) Appl. No.: 14/415,288

(22) PCT Filed: Aug. 14, 2014

(86) PCT No.: PCT/JP2014/071817
§ 371 (c)(1),
(2) Date: Jan. 16, 2015

(87) PCT Pub. No.: WO2015/025901
PCT Pub. Date: Feb. 26, 2015

(65) Prior Publication Data
US 2016/0023955 A1 Jan. 28, 2016

(30) Foreign Application Priority Data

Aug. 21, 2013 (JP) ................................. 2013-171296

(51) Int. Cl.
*C04B 35/48* (2006.01)
*C04B 35/49* (2006.01)
(Continued)

(52) U.S. Cl.
CPC ................ *C04B 35/49* (2013.01); *C03B 5/43* (2013.01); *C04B 35/48* (2013.01); *C04B 35/484* (2013.01);
(Continued)

(58) Field of Classification Search
CPC ... C04B 35/119; C04B 35/48; C04B 35/484; C04B 35/4885
USPC ................................... 501/104, 105
See application file for complete search history.

(56) References Cited

U.S. PATENT DOCUMENTS 6,158,248 A * 12/2000 Beppu ....................... C03B 5/43
264/636
8,268,742 B2 * 9/2012 Sato .......................... C03B 5/43
501/104

*Primary Examiner* — Noah Wiese
(74) *Attorney, Agent, or Firm* — Bacon & Thomas, PLLC

(57) ABSTRACT

[Problems] To provide a high zirconia fused cast refractory that suffers less cracks in production and on heating, has excellent productivity, is hard to form zircon crystals with the refractory solely and under conditions where the refractory is in contact with molten glass, is hard to suffer cracks on receiving heat cycles in operation of a glass melting furnace, and has durability for a prolonged period of time.

[Solution to Problems] A high zirconia fused cast refractory containing, as chemical components, from 85 to 95% by weight of $ZrO_2$, from 0.4 to 2.5% by weight of $Al_2O_3$, from 3.5 to 10% by weight of $SiO_2$, from 0.05 to 1% by weight in total of $Na_2O$ and $K_2O$, more than 0.04% by weight and 1% by weight or less of $B_2O_3$, 0.02% by weight or less of $P_2O_5$, 0.05% by weight or less of MgO, from 0.01 to 0.2% by weight of CaO, in the case where any one of SrO and BaO is contained, from 0.3 to 3% by weight of SrO or more than 0.5% by weight and 3% by weight or less of BaO, and in the case where both of them are contained, 0.3% by weight or more of SrO and from 0.3 to 3% by weight in total of SrO and BaO, from 0.01 to 0.7% by weight of $SnO_2$, and 0.3% by weight or less in total of $Fe_2O_3$ and $TiO_2$.

18 Claims, 3 Drawing Sheets

(51) Int. Cl.
  *C03B 5/43*    (2006.01)
  *C04B 35/657*  (2006.01)
  *F27B 14/10*   (2006.01)
  *F27D 1/00*    (2006.01)
  *C04B 35/484*  (2006.01)
  *F27D 1/16*    (2006.01)

(52) U.S. Cl.
  CPC ............ *C04B 35/657* (2013.01); *F27B 14/10* (2013.01); *F27D 1/00* (2013.01); *F27D 1/0006* (2013.01); *F27D 1/16* (2013.01); *C04B 2235/3201* (2013.01); *C04B 2235/3206* (2013.01); *C04B 2235/327* (2013.01); *C04B 2235/3208* (2013.01); *C04B 2235/3213* (2013.01); *C04B 2235/3215* (2013.01); *C04B 2235/3217* (2013.01); *C04B 2235/3225* (2013.01); *C04B 2235/3232* (2013.01); *C04B 2235/3272* (2013.01); *C04B 2235/3281* (2013.01); *C04B 2235/3293* (2013.01); *C04B 2235/34* (2013.01); *C04B 2235/3409* (2013.01); *C04B 2235/3418* (2013.01); *C04B 2235/72* (2013.01)

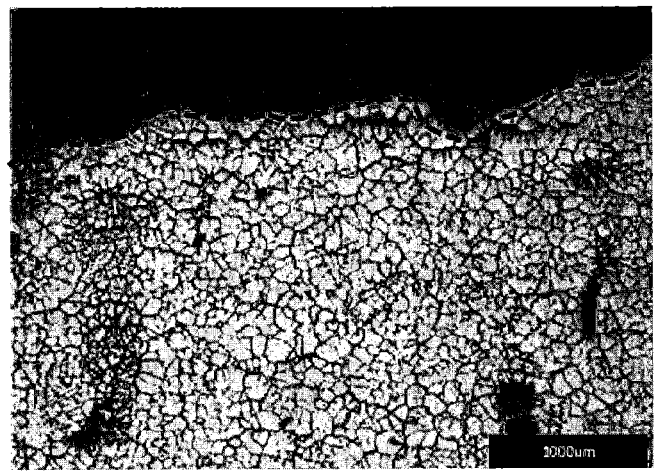
Fig.2 Example 1
State of Zircon Formation
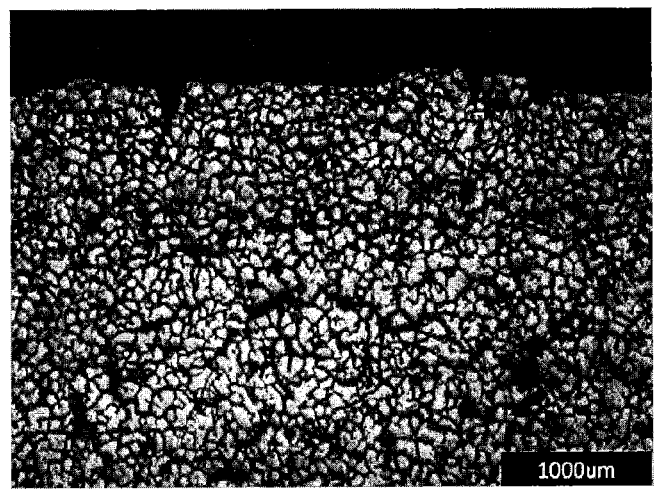
Fig.3 Comparative Example 2
State of Zircon Formation

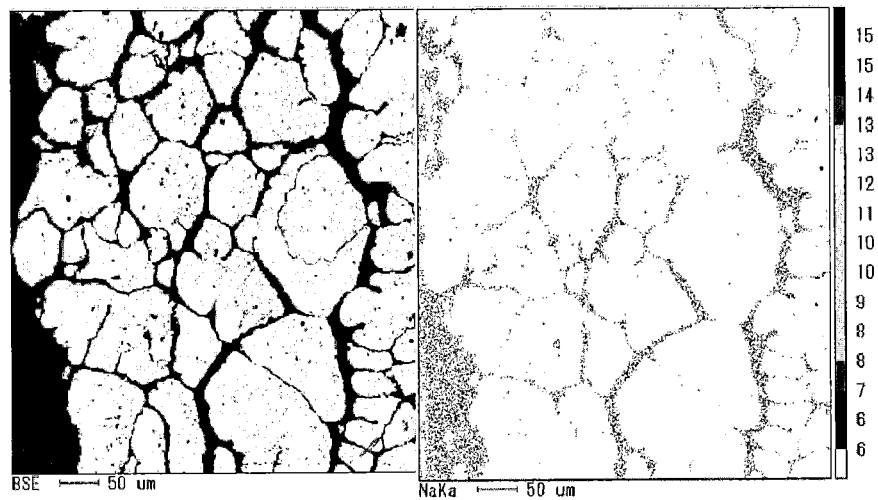
Fig. 4 Example 1
Na Distribution Chart
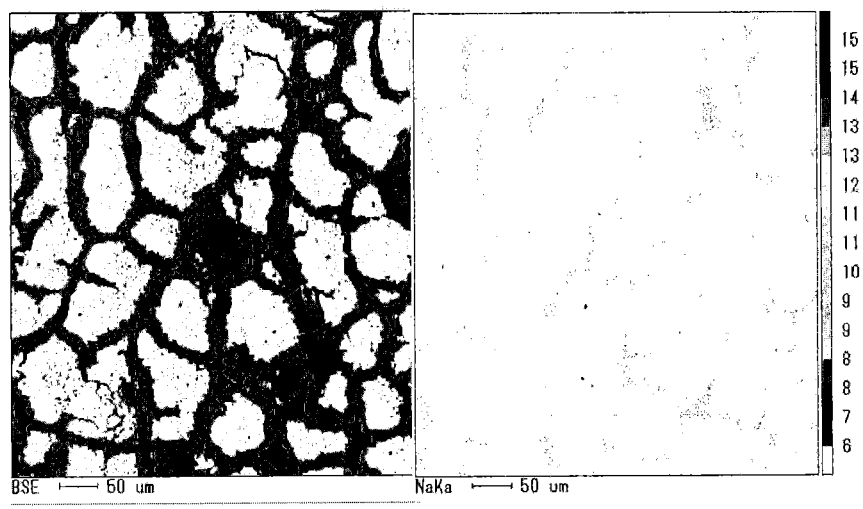
Fig. 5 Comparative Example 2
Na Distribution Chart

HIGH ZIRCONIA FUSED CAST REFRACTORY

TECHNICAL FIELD

The present invention relates to a high zirconia fused cast refractory that is excellent in heat cycle stability, hardly forms zircon crystals on using the refractory in a glass melting furnace, and may be used stably for a prolonged period of time.

BACKGROUND ART

A fused cast refractory (which may be hereinafter referred simply to as a refractory) has been frequently used as a refractory for a glass melting furnace.

A fused cast refractory is a dense refractory that is markedly excellent in corrosion resistance to molten glass, and is produced in such a manner that raw materials including a major component, such as alumina, silica and zirconia, and a minor component, such as soda and boric acid, mixed in prescribed amounts are melted in an electric furnace, and the molten material is cast in a heat resistant mold and cooled in an annealing material, thereby solidifying the material in the shape of the mold.

Example of the fused cast refractory is a high zirconia fused cast refractory containing $ZrO_2$ in an amount of 80% by weight or more.

The high zirconia fused cast refractory has an excellent corrosion resistance to any kind of molten glass due to the high content of $ZrO_2$ and the dense structure thereof.

The high zirconia fused cast refractory also has a property that no reaction layer is formed at an interface to molten glass, which provides an excellent feature that defects including stones and cords may not be formed in the molten glass.

Accordingly, the high zirconia fused cast refractory is suitable for production of high quality glass.

The most part of the mineral structure of the high zirconia fused cast refractory is occupied by monoclinic zirconia crystals, and a small amount of a glass phase is filled in the grain boundaries of the zirconia crystals.

The characteristics of the high zirconia fused cast refractory are largely influenced by the kinds and the amounts of the components constituting the glass phase.

In general, the glass phase of the high zirconia fused cast refractory is constituted by oxides including $Al_2O_3$, $SiO_2$, $Na_2O$, $B_2O_3$ and $P_2O_5$.

The zirconia crystals undergo reversible transformation between a monoclinic and a tetragonal system associated with a rapid volume change around a temperature of from 1,000° C. (on cooling) to 1,150° C. (on heating).

The stress caused by the volume change associated with the transformation of the zirconia crystals is absorbed through flowage of the glass phase filled in the grain boundaries, and thereby a high zirconia fused cast refractory that is free of cracks in production and on heating may be produced in an industrial level (subject 1).

A glass melting furnace having the high zirconia fused cast refractory frequently uses burners as a heat source. In a glass melting furnace with burners, the burners are switched every several tens of minutes, and the temperature on the surface of the fused cast refractory varies by switching on and off the burners.

Consequently, the fused cast refractory, which is often used over several years, undergoes a considerably large number of heat cycles.

The high zirconia fused cast refractory may form in some cases zircon ($ZrO_2.SiO_2$) through reaction of silica ($SiO_2$) which is a major component of the glass phase of the refractory, with zirconia ($ZrO_2$) on receiving heating or heat cycles.

In this case, zircon crystals are formed in the glass phase, and thus the formation of zircon crystals may cause relative decrease of the glass phase. On progress of the decrease of the glass phase due to growth and increase of the zircon crystals, furthermore, it may be difficult to absorb the rapid volume change of the zirconia crystals around a temperature of from 1,000 to 1,150° C.

As a result, when the amount of the zircon crystals is increased beyond a certain level, the residual volume expansion rate of the refractory is increased extremely, which may cause formation of cracks due to deterioration in strength of the refractory structure, and finally pulverization in some cases.

Accordingly, there is a demand of a high zirconia fused cast refractory that is hard to form zircon crystals and is stable against heat cycles (subject 2).

Furthermore, even in a high zirconia fused cast refractory that is hard to form zircon crystals on heating and heat cycles to the refractory solely, zircon crystals may be formed easily through contact with molten glass in some cases.

In particular, zircon crystals are often liable to form on using the high zirconia fused cast refractory in a melting furnace for non-alkali glass, such as glass for a liquid crystal display (LCD) panel (which may be hereinafter referred to as liquid crystal glass).

The zircon crystals are formed due to the phenomenon that on melting the glass, the components of the molten glass and the glass phase of the high zirconia fused cast refractory are exchanged due to the difference in concentration of the components.

Specifically, the component that suppresses the formation of zircon crystals in the high zirconia fused cast refractory may be diffused into the molten glass, or a component that is liable to form zircon crystals may be migrated to the refractory from the molten glass. It is considered that any one or both of the phenomena may occur to facilitate the formation of zircon crystals in the high zirconia fused cast refractory.

In the state where zircon crystals are formed in the high zirconia fused cast refractory used in a glass melting furnace, the amount of the glass phase is decreased thereof, the rapid volume change of the zirconia crystals around a temperature of from 1,000 to 1,150° C. may not be absorbed as described above.

Consequently, on receiving heat cycles due to heating on operation and variety in temperature on operation, the residual volume expansion rate of the refractory may be increased extremely, and the strength of the structure may be decreased, thereby easily causing cracks in the refractory. The refractory may be corroded selectively from the cracked portions, and with the progress of the corrosion, small pieces of the refractory may fall down to the molten glass to deteriorate the quality of the glass.

In the case where a high zirconia fused cast refractory that is hard to form zircon crystals through contact with molten glass is used as a furnace material, the material may be stable without the formation of zircon crystals on receiving heat cycles due to heating on operation of a glass melting furnace and variety in temperature on operation, and may be free of cracks. Furthermore, on cooling for stopping the production in the glass melting furnace, formation of new cracks and growth of cracks having been formed may be prevented.

As a result, the high zirconia fused cast refractory may be reused without replacement for the next operation after stopping operation.

As described above, there is a demand of a high zirconia fused cast refractory that is hard to form zircon crystals even under conditions where the refractory is in contact with molten glass (subject 3).

The high zirconia fused cast refractory that is hard to form zircon crystals has been investigated.

PTL 1 (JP-A-63-285173) describes a high electric resistance high zirconia fused cast refractory that contains from 90 to 98% of $ZrO_2$ and 1% or less of $Al_2O_3$, contains substantially no $Li_2O$, $Na_2O$, CaO, CuO or MgO, and contains from 0.5 to 1.5% of $B_2O_3$, or from 0.5 to 1.5% of $B_2O_3$ with 1.5% by weight or less of at least one of $K_2O$, SrO, BaO, $Rb_2O$ and $Cs_2O$.

In PTL 1, however, the glass phase of the high zirconia fused cast refractory contains a large amount of $B_2O_3$, which facilitates formation of zircon crystals, and thus the residual volume expansion rate after a heat cycle test may be large, which provides a defect of formation of zircon with the refractory solely. Furthermore, CaO for stabilizing the glass phase through control of the viscosity thereof is not contained, and thus cracks may be formed in a one-sided heating test due to failure of absorbing the stress formed in the production.

PTL 2 (JP-A-8-48573) proposes a high zirconia fused cast refractory that has high electric resistance and heat cycle stability and contains from 85 to 96% by weight of $ZrO_2$, from 3 to 8% by weight of $SiO_2$, from 0.1 to 2% by weight of $Al_2O_3$, the content of $B_2O_3$ of from 0.05 to 3% by weight, the content of $Na_2O$ of 0.05% by weight or more, the content of $Na_2O$ and $K_2O$ of from 0.05 to 0.6% by weight, and the content of BaO, SrO and MgO of from 0.05 to 3% by weight.

In PTL 2, however, CaO for stabilizing the glass phase through control of the viscosity thereof is not contained, but a large amount of MgO, which markedly facilitates formation of zircon crystals under conditions where the refractory is in contact with molten glass, and thus it is insufficient to suppress the formation of zircon crystals under conditions where the refractory is in contact with molten glass.

PTL 3 (JP-A-9-2870) proposes a high zirconia fused cast refractory that suffers less cracks in production and less cracks on heat cycles and contains from 89 to 96% by weight of $ZrO_2$, from 2.5 to 8.5% by weight of $SiO_2$, from 0.2 to 1.5% by weight of $Al_2O_3$, less than 0.5% by weight of $P_2O_5$, less than 1.2% by weight of $B_2O_3$, less than 0.3% by weight of CuO, more than 0.01 and less than 1.7% by weight of $P_2O_5+B_2O_3$, from 0.05 to 1.0% by weight of $Na_2O+K_2O$, from 0.01 to 0.5% by weight of BaO, less than 0.5% by weight of $SnO_2$, and 0.3% by weight or less of $Fe_2O_3+TiO_2$.

PTL 3 states that the addition of $Na_2O$, $K_2O$ and BaO suppresses the formation of zircon crystals even though the components that facilitate the formation of zircon crystals, such as $P_2O_5$ and $B_2O_3$, are contained.

However, the amount of BaO added for suppressing the formation of zircon crystals is small, but $P_2O_5$, which markedly facilitates the formation of zircon crystals, is contained, and the formation of zircon crystals may not be suppressed under conditions where the refractory is in contact with molten glass.

Furthermore, $SnO_2$ is not an essential component, and the effect of the addition of $SnO_2$ is not known since the effect of $SnO_2$ on the cracks in production and the cracks after heat cycles is not described.

PTL 4 (JP-A-2008-7358) proposes a high zirconia fused cast refractory that has excellent heat cycle stability and high electric resistance and contains from 87 to 96% by weight of $ZrO_2$, 0.1 or more and less than 0.8% by weight of $Al_2O_3$, from 3 to 10% by weight of $SiO_2$, less than 0.05% by weight of $Na_2O$, from 0.01 to 0.2% by weight of $K_2O$, from 0.1 to 1.0% by weight of $B_2O_3$, from 0.1 to 0.5% by weight of BaO, less than 0.05% by weight of SrO, from 0.01 to 0.15% by weight of CaO, from 0.05 to 0.4% by weight of $Y_2O_3$, less than 0.1% by weight of MgO, 0.3% by weight or less of $Fe_2O_3+TiO_2$, and less than 0.01% by weight of each of $P_2O_5$ and CuO.

However, the amount of BaO and SrO added, which are components suppressing the formation of zircon crystals, is small, and thus the formation of zircon crystals is insufficiently suppressed under conditions where the refractory is in contact with molten glass.

PTL 5 (WO 2012/046785A1) proposes a high zirconia fused cast refractory that is hard to form zircon crystals and contains from 86 to 96% by weight of $ZrO_2$, from 2.5 to 8.5% by weight of $SiO_2$, from 0.4 to 3% by weight of $Al_2O_3$, from 0.4 to 1.8% by weight of $K_2O$, 0.04% by weight or less of $B_2O_3$, 0.04% by weight or less of $P_2O_5$, 3.8% by weight or less of $Cs_2O$, and substantially no $Na_2O$.

However, the content of $B_2O_3$ and $P_2O_5$, which prevent cracks in production, is very small, but an alkali metal oxide, such as $K_2O$ and $Cs_2O$, is contained in a large amount, and thus it is insufficient for producing a large-scale product suffering less cracks in production and on heating.

Furthermore, $Cs_2O$ is a considerably expensive material to provide a problem in industrial production.

PTL 6 (WO 2012/046786A1) proposes a high zirconia fused cast refractory that is hard to form zircon crystals and contains, as essential components, from 85 to 95% by weight of $ZrO_2$, 2.5% by weight or more of $SiO_2$, 0.04% by weight or less of $Na_2O$, 0.04% by weight or less of $B_2O_3$, and 0.04% by weight or less of $P_2O_5$, in which at least one of $K_2O$ and $Cs_2O$ is contained and the following expressions (1) and (2) are satisfied.

$$0.2 \leq 0.638 \times C(K_2O) + 0.213 \times C(Cs_2O) + 0.580 \times C(SrO)/C(SiO_2) \leq 0.40 \quad (1)$$

$$0.10 \leq 0.580 \times C(SrO)/C(SiO_2) \quad (2)$$

wherein C(X) represents the content (% by weight) of the component X.

PTL 6 states that the high zirconia fused cast refractory proposed suffers less cracks in production and is hard to form zircon crystals even in contact with molten glass by specifying the molar concentration ratios of $K_2O$, $Cs_2O$ and SrO with respect to $SiO_2$ in the expressions (1) and (2).

In PTL 6, however, the content of $B_2O_3$ and $P_2O_5$, which prevent cracks in production, is very small, but an alkali metal oxide, such as $K_2O$ and $Cs_2O$, is contained in a large amount, and thus it is insufficient for producing a large-scale product suffering less cracks in production and on heating.

Furthermore, $Cs_2O$ is a considerably expensive material to provide a problem in industrial production.

CITATION LIST

Patent Literatures

[PTL 1] JP-A-63-285173
[PTL 2] JP-A-8-48573
[PTL 3] JP-A-9-2870
[PTL 4] JP-A-2008-7358
[PTL 5] WO 2012/046785A1
[PTL 6] WO 2012/046786A1

SUMMARY OF THE INVENTION

Technical Problems

An object of the invention is to provide a high zirconia fused cast refractory that suffers less cracks in production and on heating, has excellent productivity, is hard to form zircon crystals with the refractory solely and under conditions where the refractory is in contact with molten glass, is hard to suffer cracks on receiving heat cycles in operation of a glass melting furnace, and has durability for a prolonged period of time.

Solution to the Problems

The invention includes, for example, the high zirconia fused cast refractories according to claims 1 to 7.

Advantageous Effects of the Invention

The high zirconia fused cast refractory according to the invention suffers less cracks in production and on heating, and is hard to form zircon crystals even with the refractory solely or under conditions where the refractory is in contact with molten glass.

By using the high zirconia fused cast refractory according to the invention in a glass melting furnace, zircon crystals are hard to form in the refractory, whereby cracks are hard to form and hard to grow in operation, and the furnace may be operated for a prolonged period of time including resumption of the operation, which are considerably useful in industries.

By using the high zirconia fused cast refractory according to the invention in a glass melting furnace, the glass product may be prevented from being deteriorated in quality, and even after stopping the operation of the glass melting furnace, the refractory may be prevented from suffering cracks and pulverization, thereby enabling resumption of the furnace without replacement of the refractory.

BRIEF DESCRIPTION OF THE DRAWINGS

FIG. 2 The figure is a diagram showing the thickness of zircon formed in the refractory under conditions where the refractory is in contact with molten glass in the heat cycle test 3 in Example 1.

FIG. 3 The figure is a diagram showing the thickness of zircon formed in the refractory under conditions where the refractory is in contact with molten glass in the heat cycle test 3 in Comparative Example 2.

FIG. 4 The figure is a diagram showing the distribution of Na in the refractory under conditions where the refractory is in contact with molten glass in the heat cycle test 3 in Example 1.

FIG. 5 The figure is a diagram showing the distribution of Na in the refractory under conditions where the refractory is in contact with molten glass in the heat cycle test 3 in Comparative Example 2.

DESCRIPTION OF THE EMBODIMENTS

Figure 1:
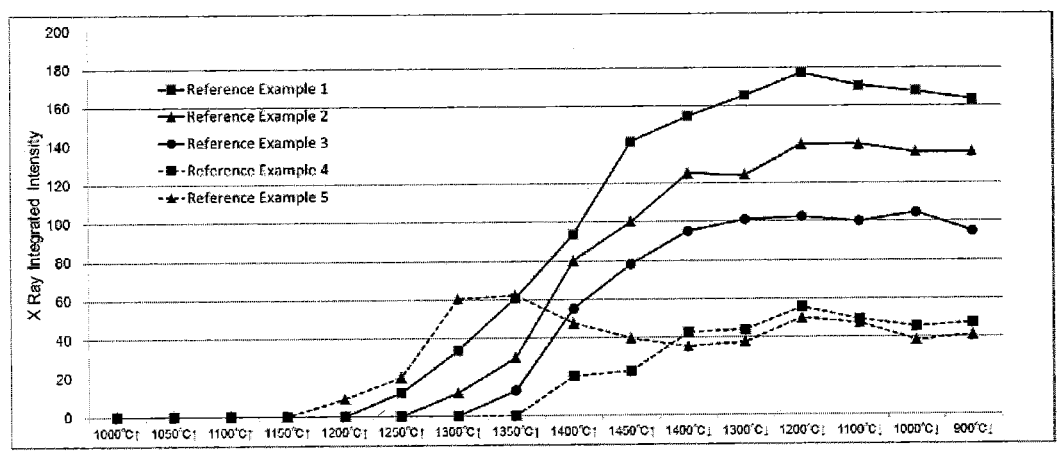
FIG. 1 The figure is a diagram showing the zircon deposition amounts determined by high-temperature X-ray diffractometry in Reference Examples.

As a result of earnest investigations made by the present inventors, it has been found that the high zirconia fused cast refractory according to the invention, which contains, as chemical components, from 85 to 95% by weight of $ZrO_2$, from 0.4 to 2.5% by weight of $Al_2O_3$, from 3.5 to 10% by weight of $SiO_2$, from 0.05 to 1% by weight in total of $Na_2O$ and $K_2O$, more than 0.04% by weight and 1% by weight or less of $B_2O_3$, 0.02% by weight or less of $P_2O_5$, 0.05% by weight or less of $MgO$, from 0.01 to 0.2% by weight of $CaO$, in the case where any one of $SrO$ and $BaO$ is contained, from 0.3 to 3% by weight of $SrO$ or more than 0.5% by weight and 3% by weight or less of $BaO$, and in the case where both of them are contained, 0.3% by weight or more of $SrO$ and from 0.3 to 3% by weight in total of $SrO$ and $BaO$, from 0.01 to 0.7% by weight of $SnO_2$, and 0.3% by weight or less in total of $Fe_2O_3$ and $TiO_2$, is hard to suffer formation of zircon crystals with the refractory solely or under conditions where the refractory is in contact with molten glass, and is suppressed from suffering formation of cracks in production and in operation of a glass melting furnace.

Accordingly, a high zirconia fused cast refractory that can be reused and has long-term durability can be thus obtained.

The high zirconia fused cast refractory preferably contains, as chemical components, from 90 to 95% by weight of $ZrO_2$, from 0.4 to 2% by weight of $Al_2O_3$, from 3.5 to 6% by weight of $SiO_2$, from 0.05 to 0.6% by weight in total of $Na_2O$ and $K_2O$, from 0.05 to 0.5% by weight of $B_2O_3$, 0.02% by weight or less of $P_2O_5$, 0.05% by weight or less of $MgO$, from 0.01 to 0.15% by weight of $CaO$, in the case where any one of $SrO$ and $BaO$ is contained, from 0.3 to 2.5% by weight of $SrO$ or more than 0.5% by weight and 2.5% by weight or less of $BaO$, and in the case where both of them are contained, 0.3% by weight or more of $SrO$ and from 0.3 to 2.5% by weight in total of $SrO$ and $BaO$, from 0.04 to 0.5% by weight of $SnO_2$, and 0.3% by weight or less in total of $Fe_2O_3$ and $TiO_2$. With respect to the expression of percentage by weight herein, for example, from 0.1 to 0.5% by weight means 0.1% by weight or more and 0.5% by weight or less.

The inventors have made detailed investigations for the evaluation method and the composition of the high zirconia fused cast refractory used in a glass melting furnace.

As an evaluation method for formation of zircon crystals, such a method has been employed that the residual volume expansion rate after a heat cycle test of heating repeatedly in a range of from 800 to 1,250° C. is measured, and the formation of zircon crystals is determined by the resulting value of the residual volume expansion rate.

In other words, there is a positive correlation between the residual volume expansion rate and the amount of zircon crystals formed, and therefore there has been a demand of a refractory that has a small residual volume expansion rate after a heat cycle test and is hard to suffer formation of zircon crystals.

However, it is clear from the results of high-temperature X-ray diffractometry shown in FIG. 1, it has been found that zircon starts to form around a temperature of 1,200° C. and is still increased even when heated to 1,450° C., and the amount of zircon crystals formed varies depending on the kinds and the adding amounts of the additives.

For evaluating the effect of the additives more accurately, the temperature conditions of the heat cycle test is revised to broaden the temperature range, i.e., the lower end temperature is changed to 600° C., which is lower than the glass transition temperature of the glass phase of the refractory (approximately 800° C.), and the higher end temperature is changed to 1,450° C., which is lower than the dissociation temperature of zircon crystals (approximately 1,550° C.) and is a temperature, at which zircon crystals grow, and thereby the effect of suppressing the formation of zircon can be evaluated more accurately even with a small number of heating.

In particular, a refractory having a residual volume expansion rate of 3% by the ordinary method, which has been considered to have an effect of suppressing the zircon crystal formation, shows a certainly large value by the novel measurement method. Consequently, the effect of suppressing the zircon crystal formation can be thus evaluated more accurately.

In the evaluation under conditions where the refractory is in contact with molten glass, the migration of the components of the glass phase of the refractory and the components of the molten glass is accelerated by performing heat cycles under heat-treatment conditions that are close to the aforementioned conditions in a state where the refractory is in contact with molten glass, and thereby zircon crystals formed in the refractory can be evaluated under conditions that are close to an actual furnace. Furthermore, cracks that are observed in an actual furnace can also be evaluated.

As a result of detailed evaluation of the composition of the refractory by the evaluation methods, it has been found that the formation of zircon crystals may be suppressed with the refractory solely or under conditions where the refractory is in contact with molten glass by a composition that contains $B_2O_3$ and CaO, contains $Na_2O$ solely, or both of $Na_2O$ and $K_2O$, and contains any one of SrO and BaO or both of BaO and SrO, and further contains $SnO_2$, and thus the invention has been completed.

In particular, $SnO_2$ has a large effect of suppressing the formation of zircon crystals under conditions where the refractory is in contact with molten glass, in addition to the effect of suppressing the formation of zircon crystals in the refractory solely, and it has been found that $SnO_2$ has an effect of restricting migration of Na ions and K ions, which are liable to be diffused into the molten glass, particularly Na ions having a small ion diameter.

As a result, a refractory having a composition that is in the range of the invention can be prevented from suffering cracks in production and on heating, and can be markedly suppressed from suffering the formation and growth of zircon crystals with the refractory solely or under conditions where the refractory is in contact with molten glass, whereby cracks are hard to form and hard to grow in operation, and the furnace may be operated for a prolonged period of time including resumption of the operation.

The content of $ZrO_2$ is preferably from 85 to 95% by weight, and more preferably from 90 to 95% by weight. When the content of $ZrO_2$ is less than 85% by weight, the corrosion resistance against glass may be lowered.

When the content of $ZrO_2$ exceeds 95% by weight, the amount of the glass phase is relatively decreased, and thus cracks are liable to occur in production and due to temperature change on heating, operation and cooling of a glass melting furnace.

$SiO_2$ is a major component of the glass phase. The content of $SiO_2$ is from 3.5 to 10% by weight, and preferably from 3.5 to 6% by weight. When the content of $SiO_2$ is less than 3.5% by weight, the content of $ZrO_2$ may be relatively increased thereby, and thus cracks are liable to occur in production and due to temperature change of a glass melting furnace. When the content of $SiO_2$ exceeds 10% by weight, the corrosion resistance may be lowered due to decrease of the $ZrO_2$ content.

The content of $Al_2O_3$ is from 0.4 to 2.5% by weight, and preferably from 0.4 to 2% by weight. $Al_2O_3$ is a component that lowers the melting temperature of the glass phase and has an effect of suppressing the formation of zircon crystals. When the content of $Al_2O_3$ is less than 0.4% by weight, the effect of suppressing the formation of zircon crystals may be insufficient. When the content of $Al_2O_3$ exceeds 2.5% by weight, crystals of corundum or mullite are liable to be deposited in the glass phase, which may cause decrease of the glass phase.

$B_2O_3$ is a component that forms, along with $SiO_2$, borosilicate glass in the glass phase of the refractory, and has an effect of preventing cracks formed in production of the high zirconia fused cast refractory and cracks generated on heating, and therefore $B_2O_3$ is an important component for achieving the subject 1.

In general, a content of $B_2O_3$ of less than 0.1% by weight may fail to provide the effect of preventing cracks in production. In the invention, however, cracks generated in production and cracks generated on heating may be prevented when $B_2O_3$ is contained in an amount exceeding 0.04% by weight due to the presence of $SnO_2$.

When the content of $B_2O_3$ exceeds 1% by weight, on the other hand, the formation of zircon crystals may be disadvantageously facilitated. Accordingly, the content of $B_2O_3$ is preferably more than 0.04% by weight and 1% by weight or less. The content of $B_2O_3$ is more preferably from 0.05 to 0.5% by weight.

$Na_2O$ and $K_2O$ have an effect of markedly suppressing the formation of zircon crystals in the glass phase of the refractory, and thus are important components for achieving the subjects 2 and 3.

In the invention, $Na_2O$ solely may be contained, or both $Na_2O$ and $K_2O$ may be contained In general, in production of a large-scale product, such as a refractory of a glass melting furnace, when the content of $B_2O_3$ having an effect of preventing cracks from being formed in production and on heating is small, the heat expansion rate is large, and $Na_2O$ and $K_2O$ markedly lowering the viscosity of the glass phase are contained in large amounts (for example, 0.4% by weight or more), large cracks are liable to occur associated with effusion of glass at edges and a large surface of the product, and furthermore cracks are liable to occur on heating. Accordingly, the product is necessarily ground away in a certain thickness to remove the cracks in production, which may cause a problem in productivity.

In the invention, however, cracks in production and on heating may be prevented from occurring even with a small $B_2O_3$ content and a large $Na_2O$ and $K_2O$ content, due to the presence of $SnO_2$ contained.

Furthermore, under conditions where the refractory is in contact with molten glass, Na and K contained in the glass phase of the refractory are liable to migrate to the molten glass, and as a result, zircon is liable to form in the glass phase of the refractory.

In the case where at least one of BaO and SrO, and $SnO_2$ are contained in the ranges of the invention, however, the migration of Na and K may be restricted to maintain the effect of suppressing the formation of zircon crystals.

When the total amount of $Na_2O$ and $K_2O$ is 0.05% by weight or less, the effect of forming zircon crystals with the refractory solely may be inhibited, and when the total amount thereof exceeds 1% by weight, cracks may form in production.

Accordingly, the total amount of $Na_2O$ and $K_2O$ is from 0.05 to 1% by weight.

The total amount of $Na_2O$ and $K_2O$ is more preferably from 0.05 to 0.6% by weight.

BaO and SrO lower the viscosity of the molten material on melting the raw materials, as similar to CaO, and form a stable glass phase in the refractory to prevent cracks generated in a one-sided heating test. Within the range of the invention where $SnO_2$ is contained, BaO and SrO also have an effect of suppressing the formation of zircon crystals in the glass phase of the refractory, and thus are important components for achieving the subjects 2 and 3.

BaO and SrO are each present in the glass phase without formation of a solid solution with $ZrO_2$ crystals, and even when BaO and SrO are in contact with the molten glass, they are hard to migrate to the molten glass due to the relatively large ion radii thereof, thereby maintaining the effect thereof. Hence, any one of BaO and SrO may be used.

In melting of liquid crystal glass, which is a major purpose of the refractory of the invention, however, liquid crystal glass may often have a relatively small BaO content and a large SrO content. Accordingly, under conditions where the refractory is in contact with molten glass, Ba ions are liable to be diffused from the glass phase of the refractory to the molten glass. Therefore, under conditions where the refractory is in contact with molten glass, the effect may not be maintained for a prolonged period of time unless BaO is contained in such an amount that is larger than the amount thereof capable of suppressing the formation of zircon crystals with the refractory solely (i.e., conditions where the refractory is not in contact with molten glass).

Accordingly, under conditions where the refractory is in contact with molten glass, the content of BaO preferably exceeds 0.5% by weight.

On the other hand, SrO is contained in a larger amount in liquid crystal glass than BaO, and therefore under the conditions where the refractory is in contact with molten glass, Sr ions are hard to be diffused from the glass phase of the refractory to the molten glass. Accordingly, under the conditions where the refractory is in contact with molten glass, SrO may be contained in an amount that is equivalent to the amount capable of suppressing the formation of zircon crystals with the refractory solely (i.e., conditions where the refractory is not in contact with molten glass).

When the content of at least one of BaO and SrO exceeds 3% by weight, the content of $ZrO_2$ may be relatively decreased, whereby the corrosion resistance of the refractory may be deteriorated, and silicate compounds of barium and strontium may be formed to make the glass phase unstable.

In the case where any one of SrO and BaO is contained, it is preferred that the content of SrO is from 0.3 to 3% by weight or the content of BaO is more than 0.5% by weight and 3% by weight or less, and in the case where both of them are contained, it is preferred that the content of SrO is 0.3% by weight or more, and the total content of SrO and BaO is from 0.3 to 3% by weight. In the case where any one of SrO and BaO is contained, it is more preferred that the content of SrO is from 0.3 to 2.5% by weight or the content of BaO is more than 0.5% by weight and 2.5% by weight or less, and in the case where both of them are contained, it is more preferred that the content of SrO is 0.3% by weight or more, and the total content of SrO and BaO is from 0.3 to 2.5% by weight.

In the case where any one of SrO and BaO is contained, it is further preferred that the content of SrO is from 0.3 to 2% by weight or the content of BaO is more than 0.5% by weight and 2% by weight or less, and in the case where both of them are contained, it is further preferred that the content of SrO is 0.3% by weight or more, and the total content of SrO and BaO is from 0.3 to 2% by weight.

CaO lowers the viscosity of the molten material on melting the raw materials, as similar to BaO and SrO, and forms a stable glass phase in the refractory to prevent cracks generated in a one-sided heating test. Thus, CaO is an essential component in the invention.

In melting of liquid crystal glass, which is a major purpose of the refractory of the invention, liquid crystal glass contains CaO in a relatively large amount as similar to SrO, and under the conditions where the refractory is in contact with molten glass, migration of Ca ions from the glass phase of the refractory to the molten glass is hard to occur, and thus shows less influence on the characteristics of the refractory.

CaO within a certain range has an effect of suppressing the formation of zircon crystals, but in the invention, when the content of CaO exceeds 0.2% by weight, the residual volume expansion rate of the refractory after a heat cycle test may be increased, and thus the content of CaO is preferably 0.2% by weight or less.

CaO is contained as an impurity in the $ZrO_2$ raw material, and therefore the raw material may be selected carefully. CaO may be added separately in some cases depending on the purity of the raw material.

The content of CaO is preferably from 0.01 to 0.2% by weight, more preferably from 0.01 to 0.15% by weight, and further preferably from 0.05 to 0.15% by weight.

MgO lowers the viscosity of the glass phase of the refractory on melting, as similar to BaO and SrO, and forms a stable glass phase, but only a small amount thereof, such as approximately 0.1% by weight, may accelerate the formation of zircon crystals with the refractory solely and under conditions where the refractory is in contact with molten glass, and therefore MgO is preferably not contained in the invention.

In the case where zircon crystals are formed to decrease the amount of the glass phase of the refractory, MgO is liable to form a solid solution with $ZrO_2$ crystals. When MgO forms a solid solution with $ZrO_2$ crystals, the $ZrO_2$ crystals may have different heat expansion rates between the part containing MgO forming a solid solution and the part containing no MgO. Accordingly, when the refractory receives heat cycles under the condition where MgO forms a solid solution with $ZrO_2$ crystals, the residual volume expansion rate of the refractory after receiving heat cycles may be extremely increased, which resulting in pulverization in some cases, and therefore the content of MgO is necessarily restricted.

MgO is also contained as an impurity in the $ZrO_2$ raw material, and therefore the raw material may be selected carefully. However, MgO may not be added separately irrespective of the purity of the raw material.

The content of MgO is preferably 0.05% by weight or less, more preferably 0.02% by weight or less, and further preferably 0.01% by weight or less.

$SnO_2$ has an effect of decreasing the viscosity of the glass phase of the refractory to form a stable glass phase. $SnO_2$ also has markedly useful effects, for example, $SnO_2$ has, even with a composition having a small $B_2O_3$ content, an effect of preventing cracks generated in production and on heating of the high zirconia fused cast refractory, and has, even with a composition having relatively small $Na_2O$ and $K_2O$ contents, an effect of providing a dense refractory, an effect of shifting the zircon crystal forming temperature to the high temperature side and suppressing the amount of zircon formed, and an effect of suppressing migration of Na ions and K ions, particularly migration of Na ions, under conditions where the refractory is in contact with molten glass. Accordingly, $SnO_2$ is an important component of the invention for achieving the subjects 2 and 3.

In the case where $SnO_2$ is contained along with at least one of BaO and SrO, the formation and growth of zircon crystals may be considerably suppressed due to the synergistic effect with BaO and SrO.

While the mechanism of the useful effect of $SnO_2$ is not necessarily clear, it is considered that there are such factors as the possibility that $SnO_2$ is present as a glass-forming oxide as similar to $SiO_2$ and $B_2O_3$, the possibility that release and absorption of oxygen are relatively liable to occur due to the valency change between bivalent and tetravalent under a certain temperature condition, and the electroconductivity of $SnO_2$.

In the case where the content of $SnO_2$ is too large, however, the refractory may be colored, and the number of bubbles generated in the molten glass may be increased.

Accordingly, the content of $SnO_2$ is preferably from 0.01 to 0.7% by weight, and more preferably from 0.04 to 0.5% by weight.

$P_2O_5$ has an effect of preventing cracks generated in production and on heating, as similar to $B_2O_3$.

However, $P_2O_5$ markedly facilitates the formation and growth of zircon crystals in the high zirconia fused cast refractory even with a small amount thereof. $P_2O_5$ also has large hygroscopicity, and on using $P_2O_5$ in the raw materials, a dense refractory may be hard to be produced.

Accordingly, the refractory preferably contains substantially no $P_2O_5$. $P_2O_5$ is also contained as an impurity in the $ZrO_2$ raw material, and the term "containing substantially no" referred herein means a content of $P_2O_5$ of 0.02% by weight or less. The content of $P_2O_5$ is more preferably 0.01% by weight or less, and further preferably less than 0.01% by weight.

$Fe_2O_3$ and $TiO_2$ are impurities in the $ZrO_2$ raw material.

These oxides, $Fe_2O_3$ and $TiO_2$, may cause coloration and bubbles generated in the molten glass, and the contents thereof may be necessarily restricted. The contents of $Fe_2O_3$ and $TiO_2$ are each preferably 0.3% by weight or less.

The contents thereof are each preferably 0.2% by weight or less.

CuO is a component that colors the molten glass even with a small amount thereof, and the content thereof may be necessarily restricted to such a level that causes no coloration. Accordingly, the content of CuO is preferably 0.02% by weight or less.

The content of CuO is more preferably 0.01% by weight or less, and further preferably less than 0.01% by weight.

$Y_2O_3$ is present as an impurity in the zirconia raw material, and increases the residual volume expansion rate after heat cycles, and therefore the raw material may be selected carefully.

When the content of $Y_2O_3$ exceeds 0.3% by weight, the residual volume expansion rate of the refractory after heat cycles may be increased to deteriorate the heat cycle stability. Accordingly, the content of $Y_2O_3$ is preferably 0.3% by weight or less, and further preferably 0.2% by weight or less.

As an additional additive, ZnO is also useful due to the effect of suppressing the formation and growth of zircon crystals. However, ZnO contained may prevent a dense refractory from being produced, thereby deteriorating the corrosion resistance of the refractory.

Example

The high zirconia fused cast refractory of the invention will be described with reference to preferred examples below.

A zirconia raw material, which was obtained through desiliconization of zircon sand, was mixed with other raw materials including oxide raw materials, such as $SiO_2$, $Al_2O_3$, $Na_2O$, $B_2O_3$, BaO, SrO and $SnO_2$, and nitrate salt raw materials in prescribed ratios in terms of oxide, and then the mixture was fused in an arc electric furnace, cast in a mold, and gradually cooled in alumina powder to room temperature.

The mold used was made by graphite plate and had dimension of 100×300×300 mm, and a feeder head having an inner dimension of 140×235×350 mm was connected integrally to the upper part thereof.

After gradually cooling, the cast material was taken out from the alumina powder, and a product portion was cut off from the feeder head, thereby providing a target high zirconia fused cast refractory.

For clarifying the effect of BaO, SrO and $SnO_2$ on the formation of zircon crystals, the results of high-temperature X-ray diffractometry of refractories having compositions that are outside the invention but have small contents of $Na_2O$ and $K_2O$ (Reference Examples 1 to 5) are shown in Table 1 and FIG. 1. The amounts of the components shown in Table 1 are written by weight percent.

The tendency of the formation of zircon crystals was evaluated by high-temperature X-ray diffractometry.

Powder of a high zirconia fused cast refractory having been pulverized to several micrometers was placed in an alumina holder of a specimen heating attachment (HA-1001, available from Shimadzu Corporation) mounted on an X-ray diffractometer (XRD-6000, available from Shimadzu Corporation), and then the specimen was heated to 1,450° C. at a temperature heating rate of 20° C. per minute and then cooled to 600° C. at 20° C. per minute. On heating, X-ray diffractometry was performed every 50° C. from 1,000° C. while holding the temperature for one minute, thereby measuring the intensity of the diffraction peak of zircon. On cooling, similarly, X-ray diffractometry was performed every 100° C. from 1,400° C. to 600° C. while holding the temperature for one minute. For evaluating the state of the formation of zircon crystals, the integrated value of the maximum peak of zircon crystals was calculated as a peak area, which was designated as an evaluation value for the zircon formation amount.

Reference Example 1 is a composition containing no BaO, SrO or $SnO_2$. Zircon started to form at 1,250° C., and the formation amount thereof was increased with the rise of temperature and also increased on cooling after completing the heating to 1,450° C. The zircon intensity at 1,400° C. on cooling was 154.

Reference Example 2 is an example where BaO is added. In Reference Example 2, the zircon formation temperature was increased, and the zircon formation amount was decreased, as compared to Reference Example 1.

Reference Example 3 is an example where BaO and $SnO_2$ are added. In Reference Example 3, the zircon formation temperature was increased to 1,350° C., and the zircon integrated intensity was 95, which was lowered to 60% of Reference Example 1.

Reference Example 4 is an example where the amounts of BaO and $SnO_2$ are increased. In Reference Example 4, the zircon integrated intensity was 43, which was lowered to 30% of Reference Example 1.

Reference Example 5 is an example where SrO and $SnO_2$ are added. In Reference Example 5, the zircon formation temperature was decreased to 1,150° C., and the maximum value of the zircon formation amount appeared at 1,350° C.

In Reference Example 5, the effect of suppressing the formation of zircon crystals was sufficiently obtained, and the zircon integrated intensity was 35, which was lowered to approximately 25% of Reference Example 1.

As shown above, the addition of BaO, SrO and $SnO_2$ may markedly prevent the formation of zircon crystals.

The compositions and the characteristics of the high zirconia fused cast refractories of Examples 1 to 11 are shown in Table 2. The compositions and the characteristics of the high zirconia fused cast refractories of Comparative Examples 1 to 13 are shown in Table 3.

The amounts of the components shown in Tables 2 and 3 are written by weight percent. The analysis of the components was performed by flame photometry for $K_2O$ and $Na_2O$, an absorption method for $P_2O_5$, and ICP for the other components. The invention is not limited to these analysis methods, and may be practiced by any other analysis methods.

In the analysis in the invention, 10 spherical specimens having a diameter of 30 mm were collected on casting the molten material, and the analysis value obtained from the pulverized specimens was designated as the analysis value of the high zirconia fused cast refractory.

Cracks in production were evaluated by observing the product after taking out from the alumina powder and investigating the presence of cracks on the surface without surface finishing. The refractory having no crack was evaluated as "none", one having cracks having a width of 2 mm and a length of 50 mm at maximum was evaluated as "minute", and one having any larger cracks was evaluated as "cracked".

The heat cycle test 1 is an ordinary evaluation method.

A specimen of 50×50×100 mm was cut out from a bottom part of a surface (300×300 mm) of a refractory, and the cast surfaces of the specimen were cut out by 25 mm respectively to prepare an evaluation specimen of 50×50×50 mm.

The specimen was heated to 800° C. at a temperature heating rate of 3° C. per minute and held at that temperature for one hour. Thereafter, the specimen was heated to 1,250° C. at a temperature heating rate of 3° C. per minute and held at 1,250° C. for one hour. After being held for one hour, the specimen was cooled to 800° C. at a temperature cooling rate of 3° C. per minute and held at that temperature for one hour. The holding at 800° C. for one hour and the holding at 1,250° C. for one hour were designated as one heat cycle, and the heat cycle was repeated 20 times.

The residual volume expansion rate after the test was calculated from the dimensions before and after the heat cycle test, and cracks and pulverization of the refractory after the heat cycle test were observed.

The residual volume expansion rate in the heat cycle test 1 is preferably 2% or less, and more preferably 1% or less.

The heat cycle test 2 is a novel measurement method.

In view of the result of the high-temperature X-ray diffractometry, a heat cycle is applied in a temperature range of from 600° C. as the low temperature side, which is lower than the glass transition temperature of the glass phase of the refractory, to 1,450° C. as the high temperature side, at which zircon crystals are being continuously formed.

A specimen for the heat cycle test 2, which had the same dimension as the specimen for the heat cycle test 1, was obtained from the opposite side of the refractory to the specimen for the heat cycle test 1. The specimen was heated to 600° C. at a temperature heating rate of 3° C. per minute and held at that temperature for one hour. Thereafter, the specimen was heated to 1,450° C. at a temperature heating rate of 3° C. per minute and held at 1,450° C. for one hour. After holding for one hour, the specimen was cooled to 600° C. at a temperature cooling rate of 3° C. per minute and held at that temperature for one hour. The holding at 600° C. for one hour and the holding at 1,450° C. for one hour were designated as one heat cycle, and the heat cycle was repeated 20 times. After repeating the heat cycle 20 times, the residual volume expansion rate was calculated from the dimensions before and after the heat cycle test, and cracks and pulverization of the refractory after the heat cycle test were observed.

The residual volume expansion rate in the heat cycle test 2 may show a remarkably larger value than the result of the heat cycle test 1, which is an ordinary test method, and the tendency of zircon formation can be easily determined within a shorter period of time.

The residual volume expansion rate in the heat cycle test 2 is preferably 3% or less, and more preferably 1% or less.

The heat cycle test 3 is a novel test method for evaluating the reactivity under conditions where the refractory is in contact with molten glass.

A cubic specimen of 100×100×100 mm was cut out from a bottom corner of a trial refractory, and at the center of the specimen, a drill core was cut out to a depth of 70 mm with a drill having a diameter of 50 mm, thereby providing a crucible of the high zirconia fused cast refractory. For removing metal components remaining due to the drilling, the refractory crucible was cleaned with an acid.

In the refractory crucible, approximately 230 g of liquid crystal glass having been pulverized to approximately from 1 to 3 mm was charged. The crucible was heated to 800° C. at a temperature heating rate of 3° C. per minute and held at that temperature for 3 hours. Thereafter, the crucible was heated to 1,450° C. at the same temperature heating rate and held at that temperature for 3 hours. Thereafter, the crucible was cooled to 800° C. at a temperature cooling rate of 3° C. per minute. The holding at 800° C. for 3 hours and the holding at 1,450° C. for 3 hours were designated as one heat cycle, and the heat cycle was repeated 10 times to heat the crucible. After heating, the residual volume expansion rate of the refractory crucible was measured.

Cracks and pulverization of the refractory crucible after the heat cycle test 3 were observed.

The residual volume expansion rate after the heat cycle test 3 is preferably 5% or less, and more preferably 3% or less.

Furthermore, a drill core having a diameter of 19 mm was cut out from the bottom of the refractory crucible, thereby providing a specimen having a diameter of 19 mm and a length of 30 mm. The specimen was cut into halves at the center of the 19-mm diameter, and the cut surface was observed with a microscope to measure the thickness of the zircon formed on the bottom of the refractory crucible having been in contact with the molten glass.

The thickness of zircon formed at the interface of the refractory after the heat cycle test 3 is preferably 3 mm or less, and more preferably 2 mm or less.

The liquid crystal glass used in this test is non-alkali glass containing 60% by weight of $SiO_2$, 15% by weight of $Al_2O_3$, 7% by weight of CaO, 7% by weight of SrO, 7% by weight of $B_2O_3$, 1% by weight of MgO and 3% by weight of BaO.

A one-sided heating test was performed in the following manner. A specimen of 100×300×300 mm was placed in an electric furnace with the 300×300-mm surface being in contact with the interior of the furnace and the opposite surface being in contact with the exterior of the furnace. The specimen was heated to 1,000° C. at a rate of 100° C. per minute, and the presence of cracks on heating was observed.

Examples 1 to 11 shown in Table 2 are within the scope of the invention.

All the specimens were free of cracks in production and on heating, and after the heat cycle tests, showed a small residual volume expansion rate without large cracks formed. Even after the heat cycle test 3, the specimens showed a small residual volume expansion rate, and suffered less deposition of zircon at the interface to the fused liquid crystal glass, which showed that the formation of zircon crystals was suppressed under conditions where the refractory was in contact with molten glass.

Table 3 shows Comparative Examples 1 to 13.

Comparative Example 1 is an example where BaO, SrO, $SnO_2$ and $K_2O$ are not added. In the heat cycle tests 2 and 3, the refractory showed a large residual volume expansion rate and pulverization. After the heat cycle test 3, the refractory showed a large thickness of zircon formed.

Comparative Example 2 has substantially the same composition as Comparative Example 1, where BaO, SrO, $SnO_2$ and $K_2O$ are not added. The refractory suffered minute cracks on taking out from the alumina powder. In the heat cycle test 3, the refractory suffered minute cracks and showed a thickness of zircon formed of 3.2 mm.

Comparative Example 3 is an example corresponding to PTL 5 where BaO and SrO are not contained, and $K_2O$ and $Cs_2O$ are contained. The refractory suffered large cracks in production due to effusion of the components of the glass phase. In the heat cycle test 3, the refractory suffered minute cracks. In the one-side heating test, cracks were formed.

Comparative Example 4 is an example where the total amount of BaO and SrO is large. In the heat cycle test 3, the refractory suffered pulverization and showed a large thickness of zircon formed.

Comparative Example 5 is an example where the amounts of $SiO_2$ and CaO are large, and the amount of $ZrO_2$ is small. In the heat cycle tests 2 and 3, the refractory suffered cracks, and in the heat cycle test 3, the thickness of zircon formed was large.

Comparative Example 6 is an example where the amounts of $SiO_2$, $Al_2O_3$ and BaO are small, and the amounts of $ZrO_2$ and $P_2O_5$ are large. The refractory suffered minute cracks on taking out from the alumina power. In the heat cycle test 1, the refractory suffered cracks, and in the heat cycle tests 2 and 3, the refractory suffered pulverization and showed a large thickness of zircon formed. In the one-side heating test, the refractory suffered cracks.

Comparative Example 7 is an example where the amount of $Al_2O_3$ is large, and the amounts of $Na_2O$ and $K_2O$ are small.

In the heat cycle tests 2 and 3, the refractory suffered cracks and showed a large residual volume expansion rate. In the heat cycle test 3, the refractory showed a large thickness of zircon formed.

Comparative Example 8 is an example corresponding to PTL 6 where the amount of $K_2O$ is large, $Cs_2O$ and SrO are contained, and $SnO_2$ is not contained. The refractory suffered cracks on taking out from the alumina powder. In the heat cycle test 3, the refractory suffered minute cracks. In the one-side heating test, the refractory suffered cracks.

Comparative Example 9 is an example corresponding to PTL 1 where the amount of $B_2O_3$ is large, $Na_2O$ is not contained, and $K_2O$ is contained.

In the heat cycle test 1, the refractory suffered cracks, and in the heat cycle tests 2 and 3, the refractory suffered pulverization.

Comparative Example 10 is an example corresponding to PTL 2 where BaO, SrO and MgO are contained.

In the heat cycle test 1, the refractory suffered cracks, and in the heat cycle tests 2 and 3, the refractory suffered pulverization.

Comparative Example 11 is an example corresponding to PTL 3 where $P_2O_5$, $SnO_2$ and BaO are contained.

In the heat cycle tests 1 and 2, the refractory suffered cracks, and in the heat cycle test 3, the refractory suffered pulverization.

Comparative Example 12 is an example where the amounts of $SnO_2$, $Fe_2O_3+TiO_2$, and $Y_2O_3$ are large.

The refractory after taking out from the alumina powder was deformed by thinning in the thickness direction, and the interior of the refractory was colored blackish.

In the heat cycle tests 1 and 2, the refractory suffered cracks, and in the heat cycle test 3, the refractory suffered pulverization.

Comparative Example 13 is an example corresponding to PTL 4 where the amount of BaO solely and the total amount of BaO and SrO are small, and $Na_2O$ and $SnO_2$ are not contained.

In the heat cycle tests 2 and 3, the refractory suffered cracks, and in the heat cycle test 3, the refractory showed a large thickness of zircon formed.

The structures of the cut surfaces of the refractories of Example 1 and Comparative Example 2 after the heat cycle test 3 are shown in FIGS. 2 and 3.

Example 1 and Comparative Example 2 have substantially the same composition except for $SnO_2$ and BaO in Example 1.

In FIGS. 2 and 3, the upper black portion is the liquid crystal glass, and the lower white portion is the structure of the refractory.

In Example 1, the thickness of zircon formed, which is above the broken line in FIG. 2, is approximately 0.1 mm. In Comparative Example 2, zircon is deposited over the entire structure shown in the figure, and the thickness of zircon formed including the lower portion outside the figure is 3.2 mm.

The Na mapping charts measured by EPMA (EPMA8705, available from Shimadzu Corporation) of another part of Example 1 and Comparative Example 2 in the same heat cycle test 3 are shown in FIGS. 4 and 5.

The left side of the figure is the BSE image, in which the average atomic number is expressed by the luminance, i.e., a large atomic number is shown by white. The right side of the figure is the Na mapping result, in which Na is shown by small black dots, and thus a darker portion in the mapping chart means a larger amount of Na present therein.

In Example 1 (FIG. 4) within the scope of the invention, it was found from the BSE image that the refractory was formed of zirconia as the white portion and the glass phase as the black portion without zircon crystals formed. It was also found from the Na mapping chart that Na did not migrate to the molten glass but remained in the glass phase of the refractory even under conditions where the refractory was in contact with the molten glass.

In Comparative Example 2 (FIG. 5) outside the scope of the invention, it was found from the BSE image that zircon crystals as the gray portion were formed around the zirconia crystals as the white portion. Furthermore, the most part of Na migrated from the refractory to the molten glass, and only a small amount thereof remained in the refractory.

TABLE 1

| | | Reference Example | | | | |
|---|---|---|---|---|---|---|
| | | 1 | 2 | 3 | 4 | 5 |
| Component (% by weight) | ZrO$_2$ | 93.1 | 92.3 | 92.1 | 91.9 | 91.9 |
| | SiO$_2$ | 4.9 | 5.3 | 5.2 | 5.2 | 5.2 |
| | Al$_2$O$_3$ | 0.56 | 0.56 | 0.62 | 0.81 | 0.81 |
| | Na$_2$O | <0.01 | <0.01 | <0.01 | <0.01 | <0.01 |
| | K$_2$O | 0.03 | 0.03 | 0.03 | 0.03 | 0.03 |
| | B$_2$O$_3$ | 0.47 | 0.47 | 0.46 | 0.47 | 0.47 |
| | BaO | <0.01 | 0.45 | 0.53 | 0.83 | <0.01 |
| | SrO | <0.01 | <0.01 | <0.01 | <0.01 | 0.65 |
| | CaO | 0.06 | 0.07 | 0.08 | 0.06 | 0.08 |
| | MgO | <0.01 | <0.01 | <0.01 | <0.01 | <0.01 |
| | SnO$_2$ | <0.01 | <0.01 | 0.09 | 0.12 | 0.09 |
| | Fe$_2$O$_3$ + TiO$_2$ | 0.25 | 0.25 | 0.25 | 0.25 | 0.25 |
| | CuO | <0.01 | <0.01 | <0.01 | <0.01 | <0.01 |
| | P$_2$O$_5$ | <0.01 | <0.01 | <0.01 | <0.01 | <0.01 |
| | Y$_2$O$_3$ | 0.18 | 0.18 | 0.16 | 0.19 | 0.19 |
| Zircon formation start temperature | | 1,250 | 1,300 | 1,350 | 1,400 | 1,150 |
| Zircon integrated intensity at 1,400° C. | | 154 | 125 | 95 | 43 | 35 |

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Component (% by weight) | ZrO$_2$ | 91.0 | 92.4 | 91.5 | 87.5 | 90.5 | 88.7 | 89.4 | 91.2 | 89.5 | 94.1 | 91.0 | 91.3 |
| | SiO$_2$ | 4.7 | 4.6 | 3.9 | 9.5 | 5.5 | 7.1 | 4.1 | 3.7 | 4.7 | 3.5 | 4.7 | 4.8 |
| | Al$_2$O$_3$ | 1.8 | 1.1 | 2.0 | 0.5 | 2.3 | 0.8 | 1.5 | 1.0 | 1.8 | 0.7 | 1.2 | 1.5 |
| | Na$_2$O | 0.50 | 0.16 | <0.01 | 0.03 | 0.4 | 0.01 | 0.25 | 0.05 | 0.35 | <0.01 | <0.01 | 0.45 |
| | K$_2$O | <0.01 | <0.01 | 0.35 | 0.03 | <0.01 | 0.05 | 0.25 | 0.02 | 0.52 | 0.3 | 0.45 | 0.11 |
| | B$_2$O$_3$ | 0.08 | 0.19 | 0.05 | 0.67 | 0.05 | 0.82 | 0.09 | 0.50 | 0.06 | 0.1 | 0.06 | 0.11 |
| | BaO | 0.85 | 0.77 | 0.52 | 0.53 | <0.01 | 0.52 | 0.70 | 2.50 | 1.50 | 0.52 | 0.00 | 0.31 |
| | SrO | <0.01 | <0.01 | 0.53 | <0.01 | 0.32 | 0.60 | 2.20 | <0.01 | 0.55 | <0.01 | 0.90 | 0.45 |
| | CaO | 0.07 | 0.08 | 0.05 | 0.03 | 0.06 | 0.12 | 0.15 | 0.03 | 0.18 | 0.03 | 0.05 | 0.05 |
| | MgO | <0.01 | 0.01 | <0.01 | 0.05 | 0.01 | <0.01 | 0.01 | 0.04 | 0.03 | <0.01 | 0.01 | 0.01 |
| | SnO$_2$ | 0.25 | 0.12 | 0.20 | 0.45 | 0.02 | 0.30 | 0.60 | 0.10 | 0.13 | 0.15 | 0.25 | 0.15 |
| | Fe$_2$O$_3$ + TiO$_2$ | 0.15 | 0.25 | 0.30 | 0.30 | 0.20 | 0.27 | 0.25 | 0.20 | 0.20 | 0.20 | 0.30 | 0.25 |
| | CuO | <0.01 | <0.01 | 0.01 | <0.01 | 0.02 | <0.01 | <0.01 | <0.01 | <0.01 | <0.01 | 0.01 | <0.01 |
| | P$_2$O$_5$ | <0.01 | <0.01 | 0.01 | <0.01 | <0.01 | 0.01 | <0.01 | <0.01 | <0.01 | 0.01 | 0.02 | <0.01 |
| | Y$_2$O$_3$ | 0.18 | 0.18 | 0.18 | 0.12 | 0.16 | 0.15 | 0.16 | 0.15 | 0.28 | 0.13 | 0.18 | 0.16 |
| Cracks in production | | none | none | none | none | none | none | none | none | none | none | none | none |
| Heat cycle test 1 | Cracks and pulverization | none | none | none | none | none | none | none | none | none | none | none | none |
| | Residual volume expansion rate (%) | 0 | 0.5 | 0.5 | 0.1 | 0.3 | 0.7 | 0.8 | 1.5 | 0.5 | 0.7 | 0.1 | 0.1 |
| Heat cycle test 2 | Cracks and pulverization | none | none | none | none | none | none | none | none | none | none | none | none |
| | Residual volume expansion rate (%) | 0.2 | 1.1 | 0.7 | 0.3 | 0.4 | 1.5 | 1.5 | 2.7 | 0.5 | 1.0 | 0.8 | 0.2 |
| Heat cycle test 3 | Cracks and pulverization | none | none | none | none | none | minute | none | minute | none | minute | none | none |
| | Residual volume expansion rate (%) | 1.0 | 1.0 | 0.3 | 0.5 | 0.5 | 3.2 | 1.7 | 4.8 | 0.2 | 1.5 | 1 | 1.2 |
| | Thickness of zircon formed (mm) | 0.05 | 0.5 | 0.2 | 1.1 | 0.1 | 1.5 | 0.2 | 2.5 | 1.0 | 1.1 | 0.1 | 0.1 |

TABLE 2-continued

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| One-side heating test | Cracks | none | none | none | none | none | none | none | none | none | none | none | none |

TABLE 3

| | | Comparative Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Component (% by weight) | $ZrO_2$ | 93.6 | 92.0 | 92.5 | 90.0 | 84.5 | 95.1 | 90.7 | 90.1 | 91.7 | 91.5 | 91.9 | 91.1 | 92.5 |
| | $SiO_2$ | 4.5 | 4.7 | 4.4 | 4.0 | 11.5 | 2.8 | 4.4 | 4.6 | 4.7 | 3.7 | 4.5 | 4.0 | 5.2 |
| | $Al_2O_3$ | 0.6 | 1.8 | 1.5 | 1.0 | 1.3 | 0.2 | 2.8 | 1.5 | 0.1 | 0.6 | 1.2 | 1.5 | 0.6 |
| | $Na_2O$ | 0.15 | 0.50 | <0.01 | 0.20 | 0.20 | 0.35 | 0.01 | <0.01 | <0.01 | 0.11 | 0.25 | 0.05 | <0.01 |
| | $K_2O$ | <0.01 | <0.01 | 0.45 | <0.01 | 0.10 | <0.01 | 0.02 | 1.30 | 0.25 | 0.02 | 0.05 | 0.25 | 0.05 |
| | $B_2O_3$ | 0.25 | 0.10 | 0.01 | 0.25 | 0.20 | 0.08 | 0.45 | 0.01 | 1.20 | 1.10 | 0.21 | 0.25 | 0.52 |
| | BaO | <0.01 | <0.01 | <0.01 | 2.50 | 0.70 | 0.35 | 0.51 | <0.01 | 0.55 | 1.51 | 0.35 | 0.51 | 0.25 |
| | SrO | <0.01 | <0.01 | <0.01 | 0.9 | 0.3 | <0.01 | 0.1 | 1.2 | <0.01 | 0.3 | <0.01 | 0.5 | 0.02 |
| | CaO | 0.05 | 0.15 | 0.06 | 0.15 | 0.25 | 0.10 | 0.06 | 0.10 | <0.01 | <0.01 | 0.06 | 0.06 | 0.12 |
| | MgO | 0.01 | 0.06 | 0.02 | 0.10 | 0.01 | 0.01 | 0.01 | 0.01 | <0.01 | 0.40 | 0.01 | 0.01 | 0.01 |
| | $SnO_2$ | <0.01 | <0.01 | <0.01 | 0.04 | 0.15 | 0.05 | 0.10 | <0.01 | <0.01 | <0.01 | 0.10 | 0.79 | <0.01 |
| | $Fe_2O_3 + TiO_2$ | 0.25 | 0.15 | 0.25 | 0.25 | 0.25 | 0.2 | 0.3 | 0.25 | 0.25 | 0.28 | 0.25 | 0.35 | 0.25 |
| | CuO | <0.01 | <0.01 | <0.01 | <0.01 | <0.01 | <0.01 | <0.01 | <0.01 | <0.01 | 0.05 | <0.01 | <0.01 |
| | $P_2O_5$ | <0.01 | <0.01 | 0.02 | <0.01 | <0.01 | 0.08 | <0.01 | <0.01 | <0.01 | <0.01 | 0.30 | <0.01 | <0.01 |
| | $Y_2O_3$ | 0.18 | 0.18 | 0.18 | 0.18 | 0.25 | 0.18 | 0.16 | 0.16 | 0.20 | 0.2 | 0.25 | 0.37 | 0.20 |
| | $Cs_2O$ | <0.01 | <0.01 | 0.3 | <0.01 | <0.01 | <0.01 | <0.01 | 0.4 | <0.01 | <0.01 | <0.01 | <0.01 | <0.01 |
| Cracks in production | | none | minute | cracked | none | none | minute | none | cracked | none | none | none | deformed colored | none |
| Heat cycle test 1 | Cracks and pulverization | cracked | none | none | none | none | cracked | none | none | cracked | cracked | cracked | cracked | none |
| | Residual volume expansion rate (%) | 12 | 1.0 | 2.0 | 9 | 8 | 10 | 3 | 0.3 | 20 | 10 | 15 | 10 | 7 |
| Heat cycle test 2 | Cracks and pulverization | pulverized | none | none | cracked | cracked | pulverized | cracked | none | pulverized | pulverized | cracked | cracked | cracked |
| | Residual volume expansion rate (%) | 30 | 2.0 | 3.0 | 15 | 20 | 35 | 19 | 1.0 | 62 | 65 | 25 | 20 | 18 |
| Heat cycle test 3 | Cracks and pulverization | pulverized | minute | minute | pulverized | cracked | pulverized | cracked | minute | pulverized | pulverized | pulverized | pulverized | cracked |
| | Residual volume expansion rate (%) | 20 | 2.0 | 5 | 25 | 15 | 45 | 15 | 1.0 | 29 | 30 | 25 | 50 | 15 |
| | Thickness of zircon formed (mm) | 20 | 3.2 | 0.2 | 15 | 5.1 | 20 | 18 | 0.4 | 20 | 20 | 3.8 | 0.4 | 15 |
| One-side heating test | Cracks | none | none | cracked | none | none | cracked | none | cracked | none | none | none | none | none |

The invention claimed is:

1. A high zirconia fused cast refractory comprising, as chemical components, from 85 to 95% by weight of $ZrO_2$, from 0.4 to 2.5% by weight of $Al_2O_3$, from 3.5 to 10% by weight of $SiO_2$, more than 0.05% to 1% by weight of $Na_2O$, more than 0.04% by weight and 1% by weight or less of $B_2O_3$, 0.02% by weight or less of $P_2O_5$, 0.05% by weight or less of MgO, from 0.01 to 0.2% by weight of CaO, in the case where any one of SrO and BaO is contained, from 0.3 to 3% by weight of SrO or more than 0.5% by weight and 3% by weight or less of BaO, and in the case where both of them are contained, 0.3% by weight or more of SrO and from 0.3 to 3% by weight in total of SrO and BaO, from 0.01 to 0.7% by weight of $SnO_2$, and 0.3% by weight or less in total of $Fe_2O_3$ and $TiO_2$.

2. A high zirconia fused cast refractory comprising, as chemical components, from 85 to 95% by weight of $ZrO_2$, from 0.4 to 2.5% by weight of $Al_2O_3$, from 3.5 to 10% by weight of $SiO_2$, more than 0.05% by weight of $Na_2O$, from 0 to 0.95% by weight of $K_2O$, from 0.05 to 1% by weight in total of $Na_2O$ and $K_2O$, more than 0.04% by weight and 1% or less by weight of $B_2O_3$, 0.02% by weight or less of $P_2O_5$, 0.05% by weight or less of MgO, from 0.01 to 0.2% by weight of CaO, in the case where any one of SrO and BaO is contained, from 0.3 to 3% by weight of SrO or more than 0.5% by weight and 3% by weight or less of BaO, and in the case where both of them are contained, 0.3% by weight or more of SrO and from 0.3 to 3% by weight in total of SrO and BaO, from 0.01 to 0.7% by weight of $SnO_2$, and 0.3% by weight or less in total of $Fe_2O_3$ and $TiO_2$.

3. The high zirconia fused cast refractory according to claim 1, wherein the high zirconia fused cast refractory contains 0.02% by weight or less of CuO.

4. The high zirconia fused cast refractory according to claim 1, wherein the high zirconia fused cast refractory has a residual volume expansion rate of 3% or less, which is obtained after applying 20 heat cycles to the refractory, in which one heat cycle includes holding at 600° C. for one hour, then heating to 1,450° C. and holding at 1,450° C. for one hour.

5. The high zirconia fused cast refractory according to claim 1, wherein the high zirconia fused cast refractory has a residual volume expansion rate of 5% or less, which is obtained after charging liquid crystal glass to a crucible of the high zirconia fused cast refractory, and applying 10 heat cycles thereto, in which one heat cycle includes holding at 800° C. for 3 hours, then heating to 1,450° C. and holding at 1,450° C. for 3 hours.

6. The high zirconia fused cast refractory according to claim 1, wherein the high zirconia fused cast refractory has a thickness of zircon formed on a bottom of a crucible of the high zirconia fused cast refractory of 3 mm or less, which is obtained after charging liquid crystal glass to the refractory crucible, and applying 10 heat cycles thereto, in which one heat cycle includes holding at 800° C. for 3 hours, then heating to 1,450° C. and holding at 1,450° C. for 3 hours.

7. The high zirconia fused cast refractory according to claim 1, wherein the high zirconia fused cast refractory is used in a glass melting furnace.

8. The high zirconia fused cast refractory according to claim 2, wherein the high zirconia fused cast refractory contains 0.02% by weight or less of CuO.

9. The high zirconia fused cast refractory according to claim 2, wherein the high zirconia fused cast refractory has a residual volume expansion rate of 3% or less, which is obtained after applying 20 heat cycles to the refractory, in which one heat cycle includes holding at 600° C. for one hour, then heating to 1,450° C. and holding at 1,450° C. for one hour.

10. The high zirconia fused cast refractory according to claim 2, wherein the high zirconia fused cast refractory has a residual volume expansion rate of 5% or less, which is obtained after charging liquid crystal glass to a crucible of the high zirconia fused cast refractory, and applying 10 heat cycles thereto, in which one heat cycle includes holding at 800° C. for 3 hours, then heating to 1,450° C. and holding at 1,450° C. for 3 hours.

11. The high zirconia fused cast refractory according to claim 2, wherein the high zirconia fused cast refractory has a thickness of zircon formed on a bottom of a crucible of the high zirconia fused cast refractory of 3 mm or less, which is obtained after charging liquid crystal glass to the refractory crucible, and applying 10 heat cycles thereto, in which one heat cycle includes holding at 800° C. for 3 hours, then heating to 1,450° C. and holding at 1,450° C. for 3 hours.

12. The high zirconia fused cast refractory according to claim 2, wherein the high zirconia fused cast refractory is used in a glass melting furnace.

13. A high zirconia fused cast refractory comprising, as chemical components, from 90 to 95% by weight of $ZrO_2$, from 0.4 to 2% by weight of $Al_2O_3$, from 3.5 to 6% by weight of $SiO_2$, more than 0.05% by weight of $Na_2O$, from 0 to 0.55% by weight of $K_2O$, from 0.05 to 0.6% by weight in total of $Na_2O$ and $K_2O$, from 0.05 to 0.5% by weight of $B_2O_3$, 0.02% by weight or less of $P_2O_5$, 0.05% by weight or less of MgO, from 0.01 to 0.15% by weight of CaO, in the case where any one of SrO and BaO is contained, from 0.3 to 2.5% by weight of SrO or more than 0.5% by weight and 2.5% by weight or less of BaO, and in the case where both of them are contained, 0.3% by weight or more of SrO and from 0.3 to 2.5% by weight in total of SrO and BaO, from 0.04 to 0.5% by weight of $SnO_2$, and 0.3% by weight or less in total of $Fe_2O_3$ and $TiO_2$.

14. The high zirconia fused cast refractory according to claim 13, wherein the high zirconia fused cast refractory contains 0.02% by weight or less of CuO.

15. The high zirconia fused cast refractory according to claim 13, wherein the high zirconia fused cast refractory has a residual volume expansion rate of 3% or less, which is obtained after applying 20 heat cycles to the refractory, in which one heat cycle includes holding at 600° C. for one hour, then heating to 1,450° C. and holding at 1,450° C. for one hour.

16. The high zirconia fused cast refractory according to claim 13, wherein the high zirconia fused cast refractory has a residual volume expansion rate of 5% or less, which is obtained after charging liquid crystal glass to a crucible of the high zirconia fused cast refractory, and applying 10 heat cycles thereto, in which one heat cycle includes holding at 800° C. for 3 hours, then heating to 1,450° C. and holding at 1,450° C. for 3 hours.

17. The high zirconia fused cast refractory according to claim 13, wherein the high zirconia fused cast refractory has a thickness of zircon formed on a bottom of a crucible of the high zirconia fused cast refractory of 3 mm or less, which is obtained after charging liquid crystal glass to the refractory crucible, and applying 10 heat cycles thereto, in which one heat cycle includes holding at 800° C. for 3 hours, then heating to 1,450° C. and holding at 1,450° C. for 3 hours.

18. The high zirconia fused cast refractory according to claim 13, wherein the high zirconia fused cast refractory is used in a glass melting furnace.

* * * * *